United States Patent [19]

Moen

[11] 4,417,602
[45] Nov. 29, 1983

[54] ZERO INTERNAL PRESSURE CARTRIDGE

[75] Inventor: Alfred M. Moen, Grafton, Ohio

[73] Assignee: Stanadyne, Inc., Windsor, Conn.

[21] Appl. No.: 318,743

[22] Filed: Nov. 6, 1981

[51] Int. Cl.³ .............................................. F16K 11/02
[52] U.S. Cl. ................................ 137/625.17; 251/282
[58] Field of Search ....................... 137/625.17, 625.41, 137/636.4; 251/282

[56] References Cited

U.S. PATENT DOCUMENTS

| 2,087,037 | 7/1937 | McCarthy | 251/282 |
| 3,415,280 | 12/1968 | Bucknell et al. | 137/625.17 |
| 3,693,663 | 9/1972 | Tolnai et al. | 137/625.4 |
| 3,706,324 | 12/1972 | Lyon | 137/625.41 |
| 3,726,317 | 4/1973 | Moen | 137/625.17 |
| 3,840,048 | 10/1974 | Moen | 137/625.41 |

FOREIGN PATENT DOCUMENTS 1336989 11/1973 United Kingdom .

Primary Examiner—Alan Cohan
Assistant Examiner—John A. Rivell
Attorney, Agent, or Firm—Kinzer, Plyer, Dorn & McEachran

[57] ABSTRACT

A valve includes a sleeve having a water inlet and a water outlet. There is a stem movable within the sleeve to control the flow of water from the inlet to the outlet. A pressure member is positioned within the sleeve and coaxially arranged with the stem. The pressure member is fixed relative to the sleeve and is within the path of flow from the sleeve inlet to the sleeve outlet. A fixed seal is positioned between the stem and the pressure member and a seal of equal diameter, is carried by the stem and is in sealing engagement with the sleeve. The above described seals balance the stem.

4 Claims, 12 Drawing Figures

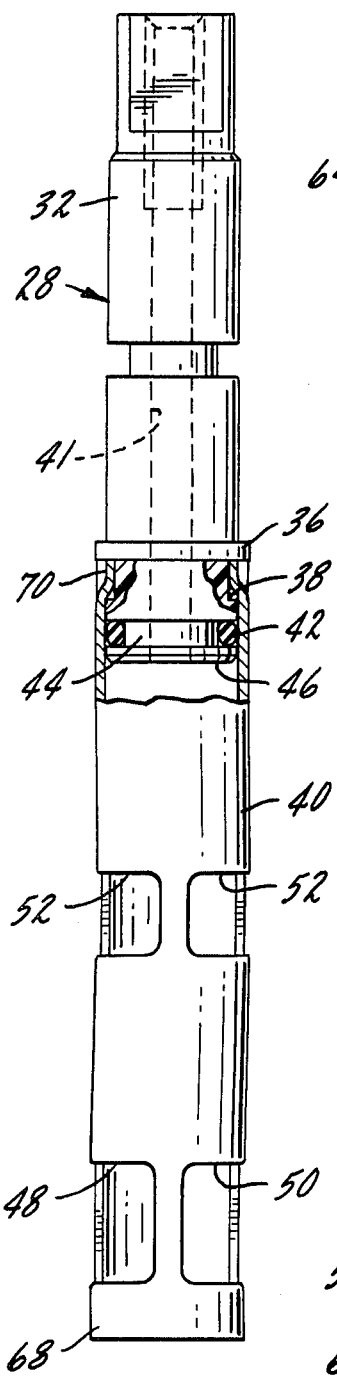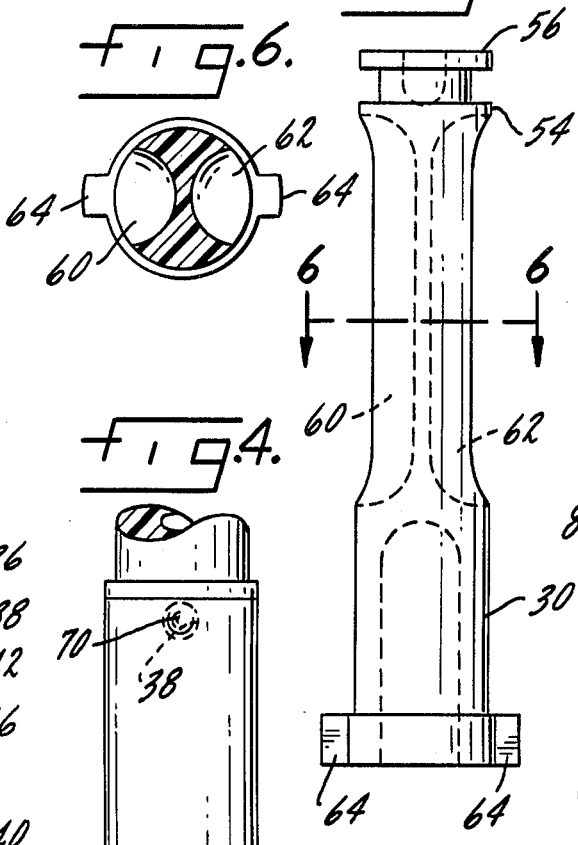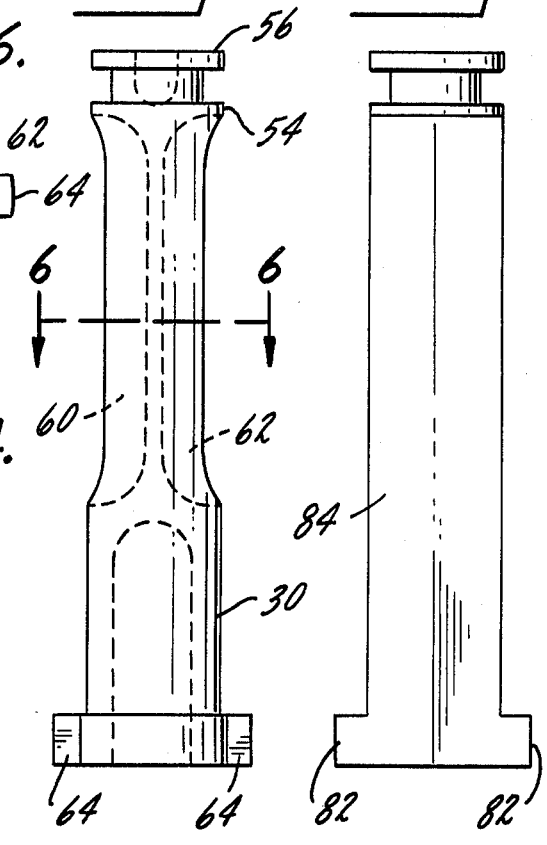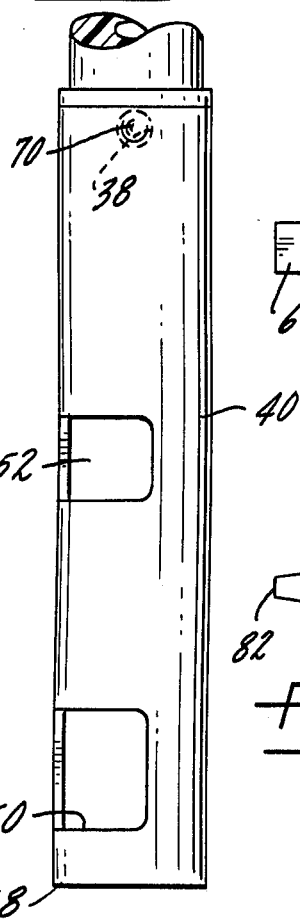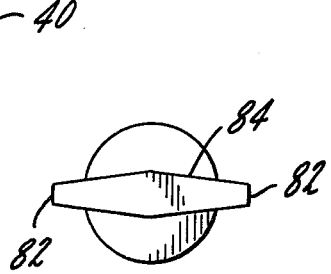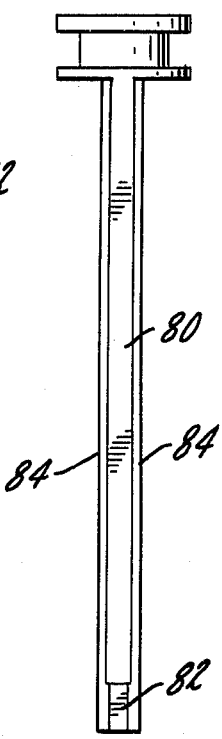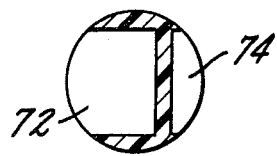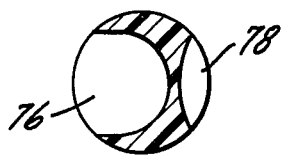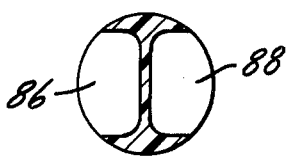

ZERO INTERNAL PRESSURE CARTRIDGE

SUMMARY OF THE INVENTION

The present invention relates to valves of the type used in residential plumbing and has particular relationship to such a valve in which the stem, controlling the flow of water through the valve, has essentially zero internal pressure applied thereto.

A primary purpose of the invention is a valve of the type described in which the movable stem, controlling the volume and temperature of water discharged from the valve is pressure balanced.

Another purpose is a mixing valve including a pressure member, fixed in position relative to the mixing valve sleeve, upon which inlet pressure is applied.

Another purpose is a mixing valve of the type described in which the pressure member has a partition separating the hot and cold water flow paths and providing flow paths of unequal volume to equalize hot and cold water pressure at the valve discharge.

Other purposes will appear in the ensuing specification, drawings and claims.

BRIEF DESCRIPTION OF THE DRAWINGS

The invention is illustrated diagrammatically in the following drawings wherein:

FIG. 3 is a plan view, in part section, of the valve member, FIG. 4 is a plan view, 90 degrees from FIG. 3 of a portion of the valve member, FIG. 5 is a plan view of the pressure member, FIG. 6 is a section along plane 6—6 of FIG. 5, FIG. 7 is a plan view of a modified form of pressure member, FIG. 8 is an end view of the pressure member of FIG. 7, FIG. 9 is a plan view of the pressure member of FIGS. 7 and 8, taken at 90 degrees to the view of FIG. 7, FIG. 10 is a radial section through a modified form of pressure member, FIG. 11 is a radial section, similar to FIG. 10, showing a further modified form of pressure member, and FIG. 12 is a radial section, similar to FIGS. 10 and 11, but showing yet an additional modified form of pressure member.

DESCRIPTION OF THE PREFERRED EMBODIMENT

The present invention relates to valves of the type customarily found in residential plumbing, for example kitchen and lavatory faucets and shower and tub valves. The principle disclosed herein may be utilized and will be explained in what is known in the trade as a mixing valve in that manipulation of a single handle controls both the volume and temperature of the outflowing water. The principle also has application in what is known in the trade as a two-handle faucet of the type wherein there is a separate handle and valve for control of the hot and cold water supplies.

Mixing valves of the type where a single handle manipulates both volume and temperature have in the past had the problem that the valve member is oftentimes under line pressure in both the open and closed positions, and if not constrained, will be moved by such pressure toward either an open or closed position, depending upon the valve configuration. Various constructions have been utilized to pressure balance the valve member so that the watercreated forces upon it, in both the open and closed positions, are balanced and thus there will be no tendency of the valve to either automatically open or close. The use of pressure balanced valves has been far more prevalent in the mixing valve area, but again, the principle disclosed herein of a valve member having essentially zero pressure applied thereto can be utilized in a two-handle faucet.

Figure 1:
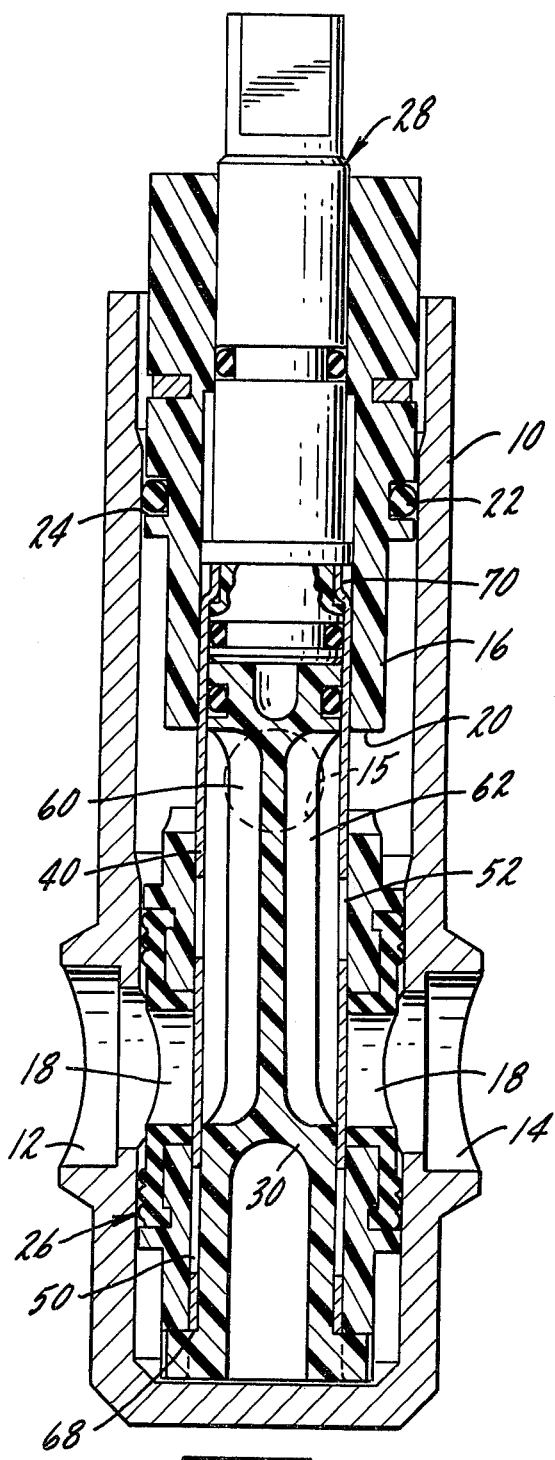
FIG. 1 is an axial section through a valve of the type described in the closed position.
Figure 2:
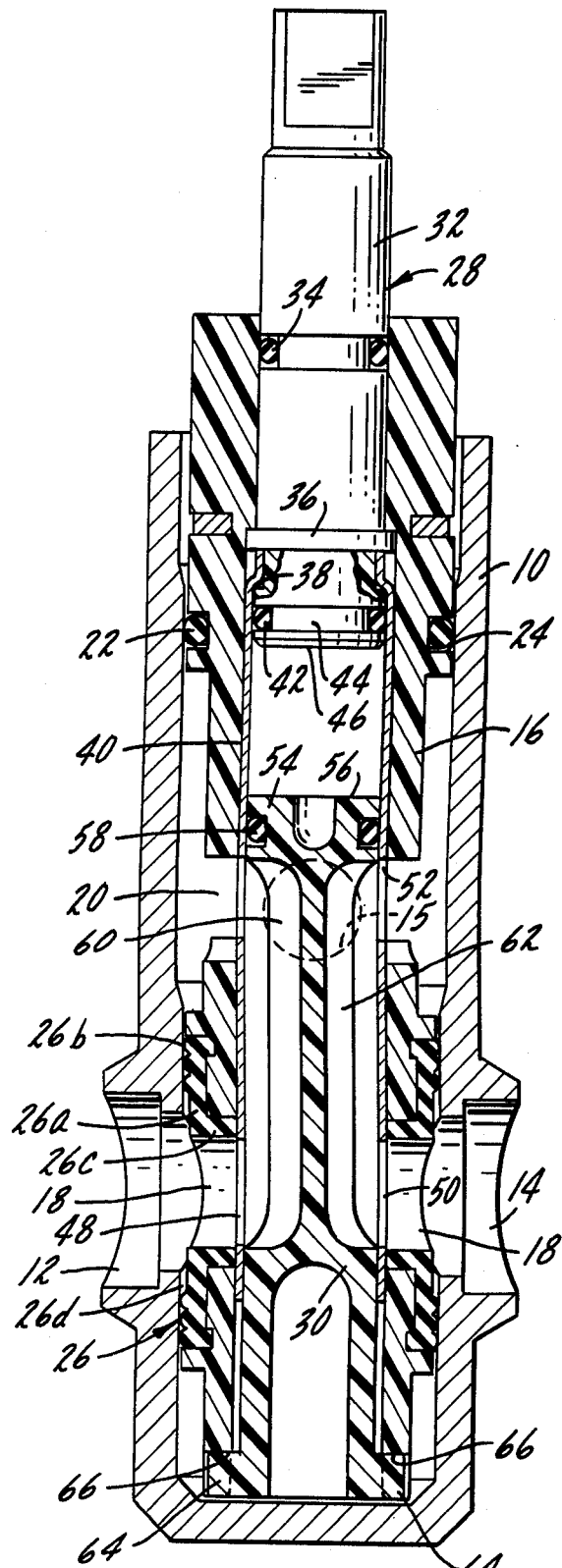
FIG. 2 is an axial section, similar to FIG. 1, illustrating the valve in the open position.

Looking specifically at FIGS. 1 and 2, the mixing valve construction described herein includes a cylindrical housing 10 which may have a hot water inlet port 12 and a cold water inlet port 14. A housing discharge port is illustrated at 15 and conventionally will be connected either directly to a spout, as in a faucet construction, or to a shower or tub discharge.

Positioned within housing 10 is a valve construction which is in the form of a cartridge in that all of the valve parts are assembled into a single unit which may be quickly and simply replaced if the valve should leak. The cartridge consists of a sleeve 16 having hot and cold water inlet ports 18 and a plurality of discharge ports indicated at 20. The discharge ports open into the space between the sleeve and housing 10 which is in communication with housing discharge port 15. Sleeve 16 is sealed to housing 10 by an O-ring 22 positioned within a groove 24 formed on the sleeve interior and by a seal construction indicated at 26, the precise nature of which is described in more detail in my U.S. Pat. No. 3,840,048.

Seal 26 is known as a grommet-type of seal, and includes a cylindrical body portion 26a which has a plurality of ribs or beads 26b in sealing relationship with the interior of housing 10. There is a port seal portion 26c which extends through the port of the sleeve and into sealing relationship with the interiorly positioned stem. There are small pressure chambers circumferentially positioned about the port seal portions 26c and indicated at 26d, which provide a water-created force on the port seal portions to provide a more firm seal with the interior stem.

Positioned within sleeve 16 is a valve member which consists of a movable stem 28 and a stationary or fixed pressure member 30. The pressure member is illustrated in more detail in FIGS. 5-12 with the stem being illustrated in FIGS. 3 and 4.

The valve stem includes a cylindrical portion 32 of an exterior dimension to fit within sleeve 16 and having an O-ring 34 positioned to seal the most exterior portion of the stem to the surrounding sleeve. Moving interiorly from seal ring 34, stem 32 has an outwardly-extending shoulder 36 functioning as a stop and retainer, adjacent a small recess 38 which receives the staked upper end of a hollow piston 40 which may be in the form of a thin metal sleeve. Piston 40, adjacent the area of recess 38, is inwardly crimped or staked to firmly attach the piston to the stem and to thus form the movable valve member. Adjacent recess 38 is a seal ring 42 positioned within an interior groove 44 which is directly adjacent end surface 46 of stem 32. An air passage 41 connects the interior of the stem with atmosphere, as is conventional.

Piston 40, as indicated above, is in the form of a hollow thin, preferably metal, sleeve which extends, in the closed position, substantially the entire length of the sleeve to bottom upon a portion of the pressure member. Piston 40 has hot and cold water inlet openings 48 and 50 which can be placed in register with hot and cold water inlet ports 12 and 14 in the housing and the mating ports in the sleeve to thereby direct water into the interior of the piston. The piston further has a plurality of discharge ports, indicated at 52, and particularly shown at FIGS. 3 and 4, which discharge ports are in register with sleeve discharge port 20 when the valve is in the open position of FIG. 2. Thus, rotation and reciprocation of the valve member, in a known manner, moves piston 40 into complete or partial register with the inlet ports and with the sleeve outlet ports to control the volume and temperature of water flowing through the valve.

Pressure member 30, illustrated in one form in FIGS. 5 and 6, with variant forms being shown in FIGS. 7–12, includes an upper generally cylindrical portion 54 having an end surface 56 in abutting relationship with stem surface 46 when the valve is in the closed position of FIG. 1. There is a seal 58 formed in a groove in cylindrical portion 54 which seals the exterior of the pressure member to the interior of piston 40 and thus effectively prevents water at inlet pressure from being applied to the movable stem. Directly adjacent cylindrical portion 54 the pressure member has two curved recesses 60 and 62 of substantial size, which recesses are respectively in communication with hot and cold water ports 48 and 50 in piston 40. The recesses provide a means of independently conveying the hot and cold water to the piston discharge ports 52. Adjacent the bottom or innermost end of pressure member 30 it has outwardly-directed feet 64 which interlock with corresponding grooves 66 in the sleeve so as to fix the pressure member to the sleeve or prevent relative movement between the pressure member and the sleeve.

Piston 40 will be subject to a minimum amount of internal water pressure, but on two generally equal areas which will receive pressures which will balance each other. The inside of piston 40 is sealed by ring 58 which has the same external diameter as ring 34, thus balancing the stem.

In operation, the closed position of the valve is shown in FIG. 1 and the stem is abutted against the pressure member. Seal members 26 prevent any water pressure from reaching the stem and thus the stem has zero internal water pressure applied thereto. When the valve is opened, the stem is reciprocated to the position of FIG. 2 and the valve is rotated to provide the desired mixture of hot and cold water at discharge port 15. The only water pressure is that upon piston 40 and such pressures are balanced by equally sized seal rings 58 and 34. For all practical purposes, the stem has zero internal water pressure applied thereto.

Although in the past most parts of water faucet valves have been made of metal, it is prevailing practice to make many of these parts of a suitable plastic. Thus, the sleeve, the stem and the pressure member may all be made of plastic. Preferably, the piston will be made of a thin gage metal, although in some applications it may also be plastic.

As shown in FIG. 6, grooves 60 and 62 are of equal size, thus conveying equal amounts of hot and cold water. However, in some areas cold water pressure is much higher than the available hot water pressure, and thus if the hot and cold water passages are of equal size, it may be difficult to provide the desired water temperature at the valve outlet. Also, in those instances in which a toilet is flushed, causing a sudden reduction in cold water pressure, even with the use of a pressure balancing spool of the type known in the art, the user of a shower may be momentarily uncomfortable. Accordingly, for those areas it is desired to provide a pressure member which does not have equal volumes or flow paths for hot and cold water. FIGS. 10 and 11 illustrate variations of the pressure member which may be so constructed. In FIG. 10, a hot water flow path is indicated at 72 and a cold water flow path is indicated at 74. Note that the hot water path is substantially larger and assuming cold water pressure is greater than hot water pressure, such unequal flow paths or provision for unequal volumes of flow, will provide relatively constant and equal amounts of hot and cold water within the valve. FIG. 11 shows a similar configuration with the hot water flow path being indicated at 76 and the cold water path at 78. The construction of FIG. 11 will provide somewhat less turbulence than that of FIG. 10.

FIGS. 7, 8 and 9 illustrate a variant form of pressure member having generally equal flow paths. In this construction, the pressure member includes a generally central vane 80 having two outwardly-extending feet 82 which will mate with grooves 66 formed in the innermost portion of the sleeve as described above. Vane 80 may have the cross sectional construction as particularly illustrated in FIG. 8 in which there are tapered sides 84 which decrease in size from the center toward the exterior.

FIG. 12 illustrates a variant form of pressure member in which internal water passages 86 and 88 are generally equal in size but of substantially greater volume capacity than the passages 60 and 62 illustrated in FIG. 6.

Because the pressure member is a separate element, although a part of the overall valve member, and may be formed of plastic, it may be readily manufactured and stocked in a variety of different sizes and shapes, relative to flow path design. The particular pressure member used in a specific area will be determined by water pressure.

The internal water passages formed in the pressure member may have screens, flow control vanes or roughened or serrated surfaces to reduce or eliminate noise in the valve.

Although we show the piston as having a constant diameter, it could be otherwise, as what is important is the relationship between the above described seal rings. Whereas the preferred form of the invention has been shown and described herein, it should be realized that there may be many modifications, substitutions and alterations thereto.

The embodiments of the invention in which an exclusive property or privilege is claimed are defined as follows:

1. A mixing valve including a sleeve having hot and cold water inlets and an outlet, a stem movable within said sleeve for controlling the volume and temperature of water discharged from said sleeve outlet, a pressure member positioned within said sleeve and coaxial with said stem, said stem including a cylindrical piston extending coaxially about said pressure member and having inlet and outlet means therein, valve closing seal means at said sleeve inlets, which seal means have portions extending into sealing engagement with said movable piston, said pressure member being fixed relative to said sleeve and being within the path of flow from said sleeve inlets to said sleeve outlet and downstream of said valve closing seal means, said pressure member having an interior partition defining one flow path from said hot water inlet and a second flow path from said cold water inlet, a seal positioned between said stem and pressure member preventing the application of inlet pressure upon said stem, a second seal carried by said stem and in sealing engagement with the interior of said sleeve, said seals having equal external diameters, balancing pressure upon said stem.

2. The structure of claim 1 further characterized in that said seal is positioned between the exterior of said pressure member and the interior of said piston.

3. The structure of claim 1 further characterized in that said partition unequally divides the space within said piston providing hot and cold water flow paths of unequal volume.

4. The structure of claim 3 further characterized in that said hot water path has a greater volume than said cold water path.

* * * * *